US 11,461,228 B2

(12) United States Patent
Ferrante et al.

(10) Patent No.: US 11,461,228 B2
(45) Date of Patent: *Oct. 4, 2022

(54) MULTILEVEL ADDRESSING

(71) Applicant: Micron Technology, Inc., Boise, ID (US)

(72) Inventors: Gianfranco Ferrante, San Giorgio a Cremano (IT); Dionisio Minopoli, Arzano (IT)

(73) Assignee: Micron Technology, Inc., Boise, ID (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/112,268

(22) Filed: Dec. 4, 2020

(65) Prior Publication Data

US 2021/0089443 A1 Mar. 25, 2021

Related U.S. Application Data

(63) Continuation of application No. 15/841,378, filed on Dec. 14, 2017, now Pat. No. 10,860,474.

(51) Int. Cl.
 *G06F 12/02* (2006.01)
(52) U.S. Cl.
 CPC .. *G06F 12/0246* (2013.01); *G06F 2212/7201* (2013.01); *G06F 2212/7211* (2013.01)
(58) Field of Classification Search
 CPC ......... G06F 12/0246; G06F 2212/7201; G06F 2212/2212; G06F 2212/7211
 See application file for complete search history.

(56) References Cited

U.S. PATENT DOCUMENTS

| 9,274,973 | B2 | 3/2016 | Manning et al. |
| 2008/0256416 | A1 | 10/2008 | Ozawa |
| 2008/0320214 | A1 | 12/2008 | Ma et al. |
| 2009/0055618 | A1 | 2/2009 | Nakanishi et al. |
| 2009/0198948 | A1 | 8/2009 | Arimilli et al. |
| 2010/0005226 | A1 | 1/2010 | Maeda et al. |
| 2010/0115192 | A1 | 5/2010 | Lee |
| 2011/0283048 | A1 | 11/2011 | Feldman et al. |
| 2012/0023282 | A1 | 1/2012 | Rub |
| 2012/0239855 | A1 | 9/2012 | Tootoonchian et al. |
| 2013/0080726 | A1 | 3/2013 | Kegel et al. |
| 2014/0297990 | A1 | 10/2014 | Manning et al. |

FOREIGN PATENT DOCUMENTS

WO 2013048503 A1 4/2013

OTHER PUBLICATIONS

International Search Report and Written Opinion from related international application No. PCT/US2018/061201, dated Mar. 6, 2019, 14 pages.

Extended European Search Report from related European Patent Application No. 18888075.1, dated Aug. 10, 2021, 9 pages.

*Primary Examiner* — Arpan P. Savla
*Assistant Examiner* — Eric T Loonan
(74) *Attorney, Agent, or Firm* — Brooks, Cameron & Huebsch, PLLC

(57) ABSTRACT

In an example, a starting address corresponding to a location of particular information within a non-volatile storage memory is determined during an initialization process using a multilevel addressing scheme. Using the multilevel addressing scheme may include performing multiple reads of the storage memory at respective address levels to determine the starting address corresponding to the location of the particular information.

20 Claims, 5 Drawing Sheets

MULTILEVEL ADDRESSING

PRIORITY INFORMATION

This application is a Continuation of U.S. application Ser. No. 15/841,378, filed on Dec. 14, 2017, which will issue as U.S. Pat. No. 10,860,474 on Dec. 8, 2020, the contents of which are incorporated herein by reference.

TECHNICAL FIELD

The present disclosure relates generally to apparatus, such as storage systems, and their operation, and, more particularly, to multilevel addressing.

BACKGROUND

Storage systems may be implemented in electronic systems, such as computers, cell phones, hand-held electronic devices, etc. Some storage systems, such as solid state drives (SSDs), may include non-volatile storage memories for storing user data from a host. Non-volatile storage memories provide persistent data by retaining stored data when not powered and may include cross-point memory, NAND flash memory, among other types of memory that can be written to a particular number of times throughout their lifetime. Storage systems typically perform an initialization procedure to locate information vital to the operation of the storage systems.

DETAILED DESCRIPTION

Figure 1A:
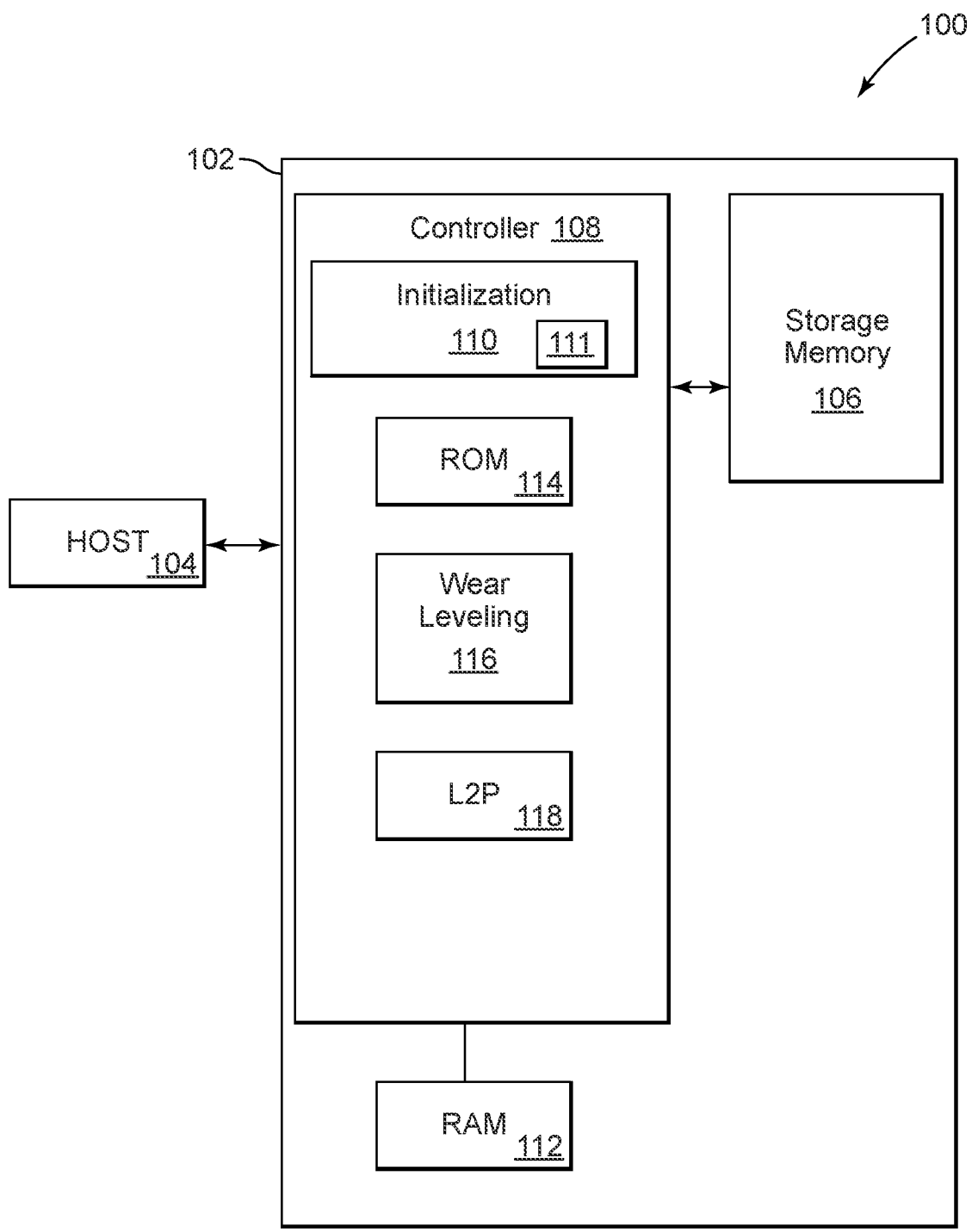
FIG. 1A is a block diagram of an apparatus, in accordance with a number of embodiments of the present disclosure.

In an example, a starting address corresponding to a location of particular information within a non-volatile storage memory is determined during an initialization process using a multilevel addressing scheme. Using the multilevel addressing scheme may include performing multiple reads of the storage memory at respective address levels to determine the starting address corresponding to the location of the particular information.

In previous approaches, the actual location in the storage memory of a storage system in which, particular information, such as initialization information (e.g., vital information), vital to the operation of the storage system, is stored may be addressed directly during the initialization. For example, in previous approaches, the initialization may be performed in response to executing instructions, such as firmware, that may specify the address of the actual physical location of the vital information. For instance, previous approaches may use single-level, direct addressing to locate the vital information.

Some previous approaches may store new vital information to the location at the single address level of a memory each time the storage system is powered down, such as by writing the new vital information to the location during each power down. For example, the previously written vital information at the location may be written over with the new vital information.

However, memory cells in storage memories may be written to a particular number of times during the lifetime of the memory cells, and the number of power downs may be many orders of magnitude (e.g., five orders of magnitude) greater than the particular number of times. For instance, in previous approaches, storage systems may need to write vital information to a location at a single address level more times than the location can be written during the lifetime of the memory cells at the location.

Embodiments of the present disclosure provide a technical advantage over previous approaches by solving the problem of writing to a location at a single address level in a storage memory, to be directly specified by an address during initialization of the storage device, by performing multilevel, indirect addressing. For example, the embodiments disclosed herein, determine a starting address corresponding to a location of vital information within a non-volatile storage memory during initialization of the apparatus using a multilevel addressing scheme that may include performing multiple reads of the storage memory.

The storage system may use the same initial address that indirectly addresses the location of the vital information during each initialization throughout the lifetime of the apparatus. In some examples, a disclosed storage system may read an intermediate address from a location having the initial address at an initial address level and read the address of the location of the vital information from a location at the intermediate address at an intermediate address level to determine the location of the vital information at a final address level.

In some embodiments, the intermediate address at the location having the initial address is changed each time the intermediate address is changed, and the intermediate address is changed each time the location of the vital information is changed. For example, the number of times the intermediate address is changed and the number of times the location of the vital information is changed may be selected such that the number of changes at the location having the initial address during the lifetime of the storage device remains below a threshold number of times. For example, the threshold number of times may be the number of times the memory cells at the location having the initial address may be written to throughout their lifetime, meaning that the initial address may remain the same during the lifetime of the storage device.

In the following detailed description, reference is made to the accompanying drawings that form a part hereof, and in which is shown, by way of illustration, specific examples. In the drawings, like numerals describe substantially similar components throughout the several views. Other examples may be utilized and structural and electrical changes may be made without departing from the scope of the present disclosure. The following detailed description is, therefore, not to be taken in a limiting sense, and the scope of the present disclosure is defined only by the appended claims and equivalents thereof.

FIG. 1A is a block diagram of an apparatus in the form of a computing system 100 in accordance with a number of embodiments of the present disclosure. The computing system 100 includes a storage system 102 that may be, for example, a solid-state drive (SSD). In the example of FIG. 1A, storage system 102 is coupled to a host 104 and includes a storage memory 106 that can be a non-volatile memory, such as a cross-point memory (e.g., a three-dimensional (3D) cross-point memory), among others. A controller 108 (e.g., an SSD controller), such as a processing device, is coupled to memory 106. As used herein, a storage system (e.g., 102), a controller (e.g., 108), and/or a storage memory (e.g., 106) may separately be considered an "apparatus."

In some examples, storage memory 106 may be a 3D cross-point memory that may include cross-point memory cells, such as 3D cross-point memory cells, located at intersections of first and second signal lines (e.g., at intersections of word lines and bit lines) that are used to access the cells. Some cross-point memory cells can be, for example, resistance variable memory cells whose state (e.g., stored data value) depends on the programmed resistance of the memory cell. For example, the memory cells may be resistance-variable memory cells that can be overwritten individually, without first being erased. The memory cells may include a material programmable to different data states.

Some resistance variable memory cells can comprise a select element (e.g., a diode, transistor, or other switching device) in series with a storage element (e.g., a phase change material, metal oxide material, and/or some other material programmable to different resistance levels). Some variable resistance memory cells, which may be referred to as self-selecting memory cells, comprise a single material that can serve as both a select element and a storage element for the memory cell. In some examples, each of the memory cells may include a material that may act as a selector material (e.g., a switching material) and a storage material, so that each memory cell may act as both a selector device and a memory element. For example, each memory cell may include a chalcogenide material that may be formed of various doped or undoped materials, that may or may not be a phase-change material, and/or that may or may not undergo a phase change during reading and/or writing the memory cell. In some examples, each memory cell may include a ternary composition that may include selenium (Se), arsenic (As), and germanium (Ge), a quaternary composition that may include silicon (Si), Se, As, and Ge, etc. In some examples, storage memory 106 may be arranged in a single tier (e.g., deck) of memory cells or in multiple tiers of memory cells.

In some examples, the controller 108 can comprise a state machine, a sequencer, and/or some other type of control circuitry, which may be implemented in the form of an application particular integrated circuit (ASIC) coupled to a printed circuit board. Controller 108 includes an initialization component 110, a read only memory (ROM) 114, a wear leveling component 116, and a mapping component, such as a logical address to a physical address (e.g., a L2P) mapping component 118. In an example, ROM 114 may be a hardware component that includes instructions that may be executed during initialization of storage system 102. Controller 108 is coupled to volatile memory, such as random access memory (RAM) 112.

Controller 108 is configured to perform the methods disclosed herein, such as initializing storage system 102, in accordance with a number of embodiments. For example, initialization component 110 performs the methods during the initialization of storage system 102. Initialization component 110 may initialize storage system 102 by determining a starting address, such as a starting address of logical to physical mapping information, corresponding to a location of vital information within storage memory 106 that is vital to the operation of storage system 102 using a multilevel addressing scheme to read storage memory 106. For example, initialization component 110 may determine the location of the vital information indirectly by performing multiple reads of storage memory 106 while using the multilevel addressing scheme. In some examples, during the initialization, storage system 102 may not be ready to accept commands, such as read and write commands, from host 104. Upon completion of the initialization, storage system 102 may send a ready signal to host 104 to indicate that storage system 102 is ready to accept commands from host 104.

In some examples, initialization component 110 may initialize storage system 102 in response to executing instructions (e.g., firmware code) stored in storage memory 106. For example, the initialization component 110 may read the instructions from storage memory 106 into RAM 112 and execute the instructions from the RAM 112.

In some examples, initialization component 110 may locate the instructions in storage memory 106 during the initialization. For example, initialization component 110 may determine the location of the instructions using a multilevel addressing scheme. For example, initialization component 110 may determine the location of the instructions by performing multiple reads of storage memory 106 while using the multilevel addressing scheme. In some examples, initialization component 110 may perform the multiple reads in response to executing the instructions, such as ROM (e.g., hardware) code, stored in ROM 114.

Figure 1B:
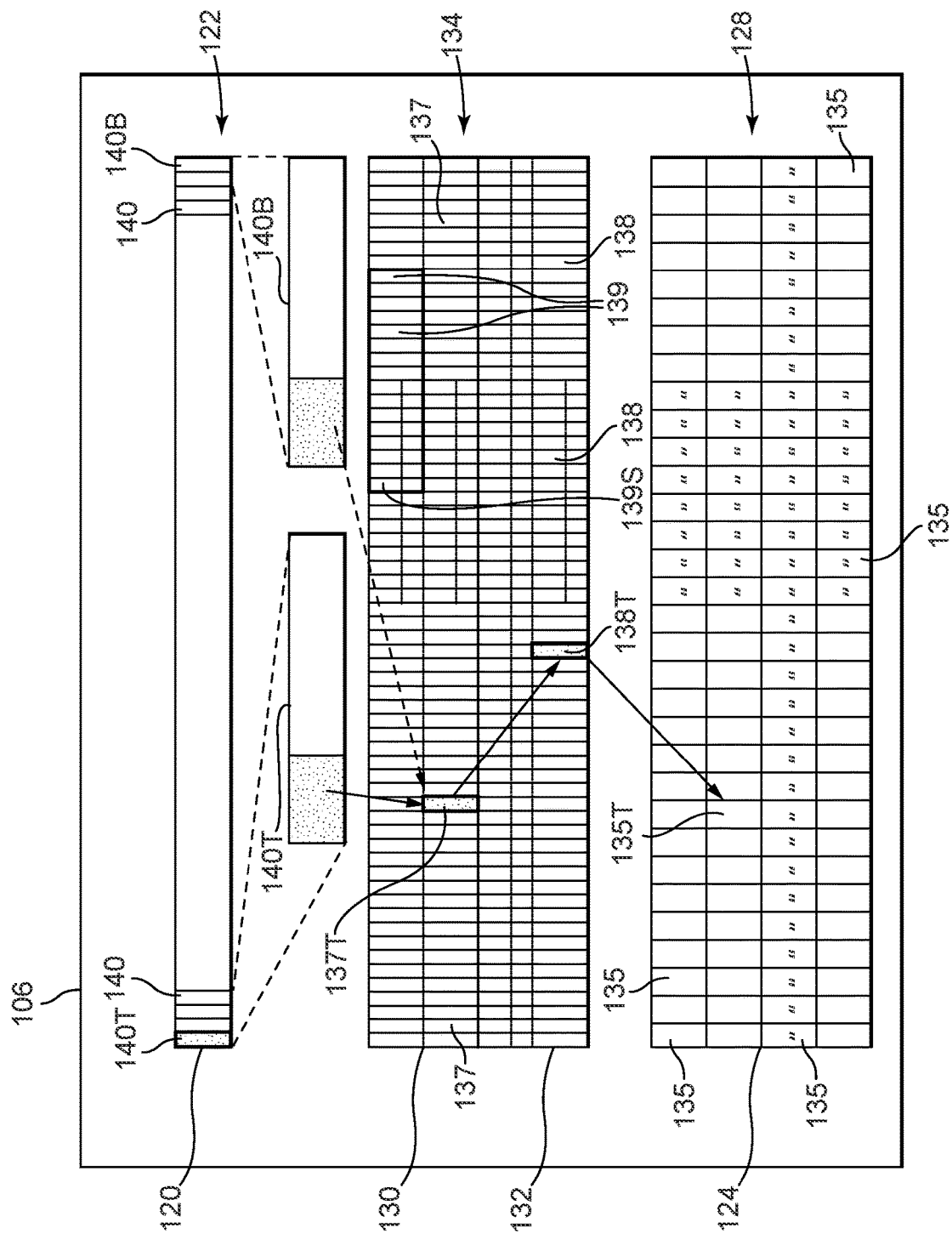
FIG. 1B illustrates an example of multiple reads of a storage memory according to a multiple level addressing scheme, in accordance with a number of embodiments of the present disclosure.

FIG. 1B illustrates an example of multiple reads of storage memory 106 according to a multiple level addressing scheme, in accordance with a number of embodiments of the present disclosure. For example, controller 108 may assign a number of different address levels to portions of storage memory 106.

An initial (e.g., a highest) address level 120 is assigned to a portion 122 of storage memory 106. A final (e.g., a lowest) address level 124 is assigned to a portion 128 of storage memory 106. A number (e.g., one or more) intermediate address levels are assigned between initial address level 120 and final address level 124. For example, intermediate address level 130 and intermediate address level 132 are assigned to a portion 134 of storage memory 106. For example, address level 130 may be a higher address level than address level 132.

Portion 134 may be used to store L2P mapping information, such as L2P tables, that may be loaded into L2P mapping component 118 during initialization of storage system 102. In an example, host 104 may send a logical address to controller 108, corresponding to data, such as user data (e.g., host data) to be written to or read from storage system 102. L2P mapping component 118 may then map the logical address to a physical address corresponding to a physical location in storage memory 106, such as in portion 128.

Storage memory 106 includes segments of memory cells. A segment is the smallest addressable unit when accessing storage memory 106. In some examples, some segments may be 16 bytes or 64 bytes, among others. In addition, memory 106 may include segments, such as 512-byte or four-kilobyte segments, etc., for storing user data, such as host data from host 104, and/or the vital information.

Portion 128 includes addressable segments 135. For example, a set of segments 135 at the final address level 124 is used to store the vital information and/or user data, and segments 135 are addressed using final addresses of the multilevel addressing and/or physical addresses from L2P mappings. For example, L2P mapping component 118 may use the L2P mapping information to map a logical address to a physical address of a segment 135 used to store user data and/or the vital information. Therefore, segments 135 may be referred to as physical blocks. In some examples, segments 135 may be the smallest addressable unit used by host 104 and may be 512 bytes or 4 kilobytes, etc. However, the segments in portion 134, such as segments 137, 138, and 139, and segments 140 in portion 122 may be 16 bytes, 64 bytes, etc., and may be smallest addressable units. Therefore, the multiple level addressing scheme portrayed in FIG. 1B may use, for example, different sized addressable units at address level 124 than at address levels 120, 130, and 132.

Portion 134 includes addressable segments 137 at intermediate address level 130 and addressable segments 138 at intermediate address level 132. For example, a set of segments 138 is used to store the final addresses of the segments 135 at final address level 124. For example, a segment 138T of the set of segments 138 may store the final address of a segment 135T that stores the vital information.

A set of segments 137 is used to store intermediate addresses of the segments 138. For example, a segment 137T of the set of segments 137 may store the intermediate address of the segment 138T at address level 132. In some examples, portion 134 may include a set segments 139 for storing the L2P mapping information.

Portion 122 includes segments 140. For example, segments 140 are used to store intermediate addresses of the segments 137. For example, a segment 140T may store the intermediate address of the segment 137T. In some examples, a segment 140B may include a copy (e.g., a backup copy) of the intermediate address stored in segment 140T. In an example, intermediate address level 130 may be omitted, in which case segment 140T may store the intermediate address of the segment 138T. In other examples, there may be other intermediate address levels assigned to portion 134 in addition to intermediate address levels 130 and 132.

The address of segment 140T may be an initial address of the multiple addressing scheme. The initial address, and thus segment 140T, may be fixed for the lifetime of storage system 102. For example, the initial address may be stored in a register 111 of component 110 or stored in storage memory 106, such as in the firmware code. The initial address may be used by initialization component 110 to determine the location of segment 140T each time storage system 102 is initialized throughout the lifetime of storage system 102. For example, the initial address may be used to indirectly address (e.g., indirectly determine the location of) segment 135T via the multiple address levels 120, 130, and 132.

The intermediate addresses stored in segment 140T and used to address segments 137 at intermediate address level 130 may be variable in that they may change in response to using another segment 137. The intermediate addresses stored in a segment 137 and used to address segments 138 at intermediate address level 132 may be variable in that they may change in response to using another segment 138. The final addresses stored in a segment 138 and used to address segments 135 at final address level 124 may be variable in that they may change in response to using another segment 135.

Figure 2:
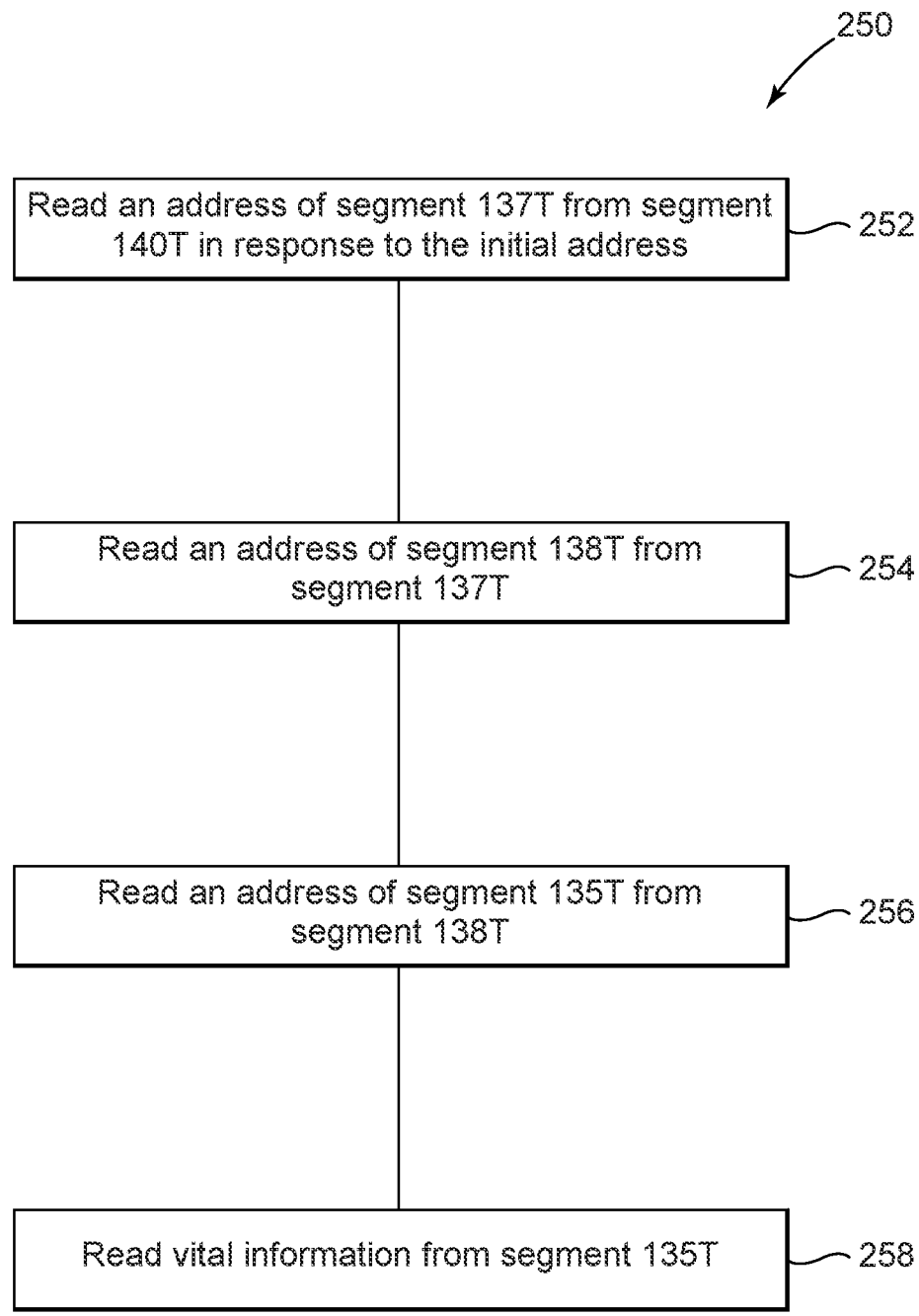
FIG. 2 is a flowchart of a method of locating vital information, in accordance with a number of embodiments of the present disclosure.

Initialization component 110 may initialize storage system 102. During the initialization, initialization component 110 may perform the method 250 depicted in the flowchart in FIG. 2 to determine the vital information. At block 252 initialization component 110 reads an address of segment 137T from segment 140T in response to the initial address. At block 254, initialization component 110 reads an address of segment 138T from segment 137T. At block 256, initialization component 110 reads the address of segment 135T from segment 138T to locate the location of vital information. At block 256, initialization component 110 reads the vital information from segment 135T.

The vital information may be a starting address of L2P mapping information. For example, the starting address may be the address of segment 139S in portion 134. Initialization component 110 may then read the L2P mapping information, starting from the starting address, into RAM 112.

Initialization component 110, may perform the method, such as method 250, for determining the vital information in response to instructions stored in storage memory 106, such as in a set of the segments 135 at address level 124. As part of the initialization, initialization component 110 may use the multiple reads in FIG. 1B to locate the instructions.

Initialization component 110 may execute instructions in ROM 114 to locate the instructions at address level 124 during the initialization. For example, an initial address in ROM 114 may address a segment 140. Initialization component 110 may read an address of a segment 137 from the segment 140. Initialization component 110 may read an address of a segment 138 from the segment 137, and then read the address of a segment 135, that may contain the instructions, from the segment 138. Initialization component 110 may then execute the instructions to locate the vital information, as previously described. In some examples, controller 108 may update the instructions in a segment 135, so that initialization component may retrieve the updated instructions using the multiple addressing, as previously described.

The segments described previously in conjunction with FIG. 1B can be written a threshold number of times during their lifetime after which time they might be replaced by other segments. For example, the memory cells in a segment, and thus the segment, may be overwritten directly, without being first erased and/or moved, until they are written the threshold number of times.

The vital information in a segment 135, such as segment 135T, may be written during each power down or a number of times between successive power downs of storage system 102 throughout the lifetime of storage system 102. In addition, user data may be written in the segment 135 between successive power downs. However, the number of power downs may be greater than the threshold number of times a segment 135 can be written. Therefore, the number of times the vital information and user data is written during the lifetime of storage system 102 is expected to be much greater, such as several (e.g., about 5 or greater than 5) orders of magnitude greater, than the threshold number of times a segment 135 can be written. Therefore, in response to writing, respectively, vital information, such as vital firmware information, or user data to segment 135T a certain number of times, the address of segment 135T may be changed (e.g., updated) to a new address of a new segment 135 by overwriting the address of segment 135T with the new address, either in segment 138T or in one of the segments of the set of segments 139 currently storing L2P mappings information. The new segment 135 may be used to store the vital information or user data until the new segment 135 is written a certain number of times, at which time the new segment is changed to a different new segment by overwriting the address of the new segment 135 with a different new address of the different new segment 135 either into segment 138T or in a segment of the set of segments 139 currently storing the L2P mapping information.

Controller 108 may allocate a number of segments 135 at address level 124 to have a combined number of potential writes that is greater than an expected number of times vital information and user data is written during the lifetime of storage system 102. For example, the number of allocated segments 135 may be greater than at least the expected number of times vital information and user data is written during the lifetime of storage system 102 divided by an expected number of times each respective segment 135 is to be written during the lifetime of the respective segment 135. The controller 108 may keep the number of segments 135 at address level 124 fixed throughout the lifetime of storage system 102. For example, controller 108 may statically allocate the number of segments 135.

Segment 138T may be overwritten until it is written the threshold number of times. Therefore, in response to writing to segment 138T the threshold number of times, the address of segment 138T in segment 137T may be changed to a new address of a new segment 138 by overwriting the address of segment 138T with the new address, thereby changing from segment 138T to the new segment 138.

Controller 108 may allocate a number of segments 137 of a set of segments 137 at address level 130, a number of segments 138 of a set of segments 138 at address level 132 and a number of segments 139 of a set of segments 139 in portion 134 to have a combined number of potential writes that is greater than an expected number of times the vital information and the user data is written during the lifetime of storage system 102. For example, controller 108 may allocate a number of segments 138 of a set of segments 138 in portion 134 to have a combined number of potential writes that is greater than the number of segments 135 used to store vital information. The number of segments 138 in the set, for example, may be determined to be greater than at least the number of segments 135 used to store Fw vital information divided by an expected number of times each respective segment 138 is to be written during the lifetime of the respective segment 138. The controller 108 may keep the number of segments of the set 138 at address level 132 fixed throughout the lifetime of storage system 102. For example, controller 108 may statically allocate the number of segments 138 of the set.

Segment 137T may be overwritten until it is written the threshold number of times. Therefore, in response to writing to segment 137T the threshold number of times, the address of segment 137T in segment 140T may be changed to a new address of a new segment 137 by overwriting the address of segment 137T with the new address, thereby changing from segment 137T to the new segment 137. A previous address of a previously written segment 137 in segment 140T may be changed to a new address of a new segment 137 each time a new segment 137 is used, for example, by overwriting the previous address in segment 140T with the new address. However, using multiple address levels as described previously can keep the number of writes to segment 140T below the threshold number of times segment 140T can be written, thereby allowing the segment 140T to be used during the lifetime of storage system 102.

In some examples, controller 108 may keep track of the number of times the segments 135, 137, 138, and 140 have been written by maintaining a write count that may be stored in segments 135, 137, 138, and 140 or in entries in a table corresponding to the segments 135, 137, 138, and 140, which table may be stored in storage memory 106.

In some examples, controller 108 may dynamically assign sets (e.g., fragments) of segments 137 of a number of sets of segments 137 at address level 130 and sets (e.g., fragments) of segments 138 of a number of sets of segments 138 at address level 132. For example, initialization component 110 may dynamically assign the sets of segments 137 and/or the sets of segments 138 during the initialization as part of wear leveling that is not performed during background operations in addition to wear leveling component 116 performing other wear leveling of storage memory 106 during background operations. In some examples, initialization component 110 may dynamically assign a different set of segments in response to a previously dynamically assigned set of segments being wear leveled and released. For example, a set of segments may be wear leveled when the segments have been written a common (e.g., the same) number of times.

Figure 3A:
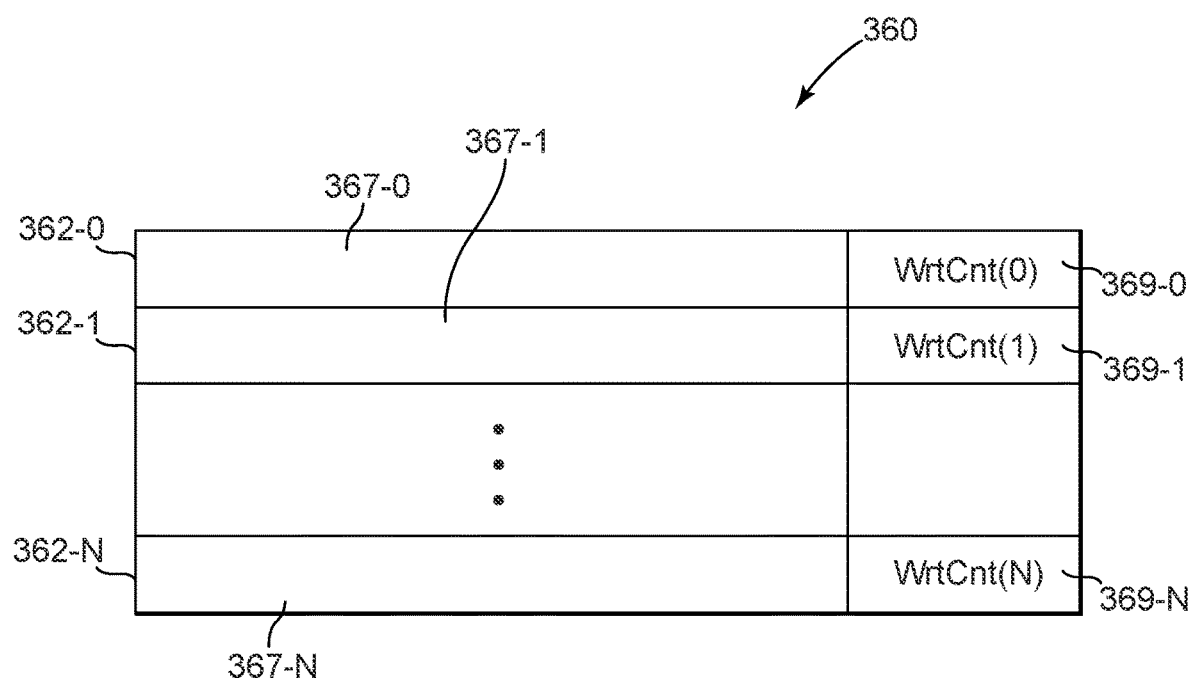
FIG. 3A is an example of a fragment of a storage memory, in accordance with a number of embodiments of the present disclosure.

FIG. 3A illustrates an example of a fragment 360 of segments 362, such as segments 362-0 to 362-N. Fragment 360 may be dynamically assigned at an intermediate address level, such as address level 130 and/or address level 132, by initialization component 110 during the initialization as part of wear leveling that is not performed during background operations. For example, the fragment 360 might be one of a number of fragments at address level 130 and/or might be one of a number of fragments at address level 132.

Each respective segment 362 includes a storage region 367. For example, segments 362-0 to 362-N respectively include storage regions 367-0 to 367-N. Each respective segment 362 includes a write count region 369 configured to store a write count WrtCnt. For example, segments 362-0 to 362-N respectively include write count regions 369-0 to 369-N respectively configured to store write counts WrtCnt(0) to WrtCnt(N).

Segments 362 may be addressed by addresses stored at a higher address level. Storage region 367 may store an address of a lower address level and may be overwritten with a new address without being first erased or moved. In some examples, a respective segment 362 may be addressed by a fragment address and a respective offset stored at a higher address level.

A respective write count WrtCnt may be a number of writes performed on the respective segment. For example, the respective write counts WrtCnt(0) to WrtCnt(N) may be the respective number of writes performed on respective segments 362-0 to 362-N. In some examples, controller 108 may increment the respective write count WrtCnt each time the respective storage region 367 is overwritten. In other examples, controller 108 may keep track of a number of overwrites of a respective storage region 367 between when storage system 102 is initialized and about to be powered down and, during each power down, may increment the respective write count WrtCnt by the number of overwrites. In an example, the write count WrtCnt may be omitted from segments 362 and controller 108 may store the write count for each segment 362 in a table that may be stored in storage memory 106.

In some examples, fragment 360 may be dynamically assigned before fragment 360 is previously written. In such examples, each segment may be written the same predetermined number of times and released when each segment is written the same predetermined number of times. Another fragment may be dynamically assigned to replace fragment 360 in response to each segment of fragment 360 being written the same predetermined number of times.

Figure 3B:
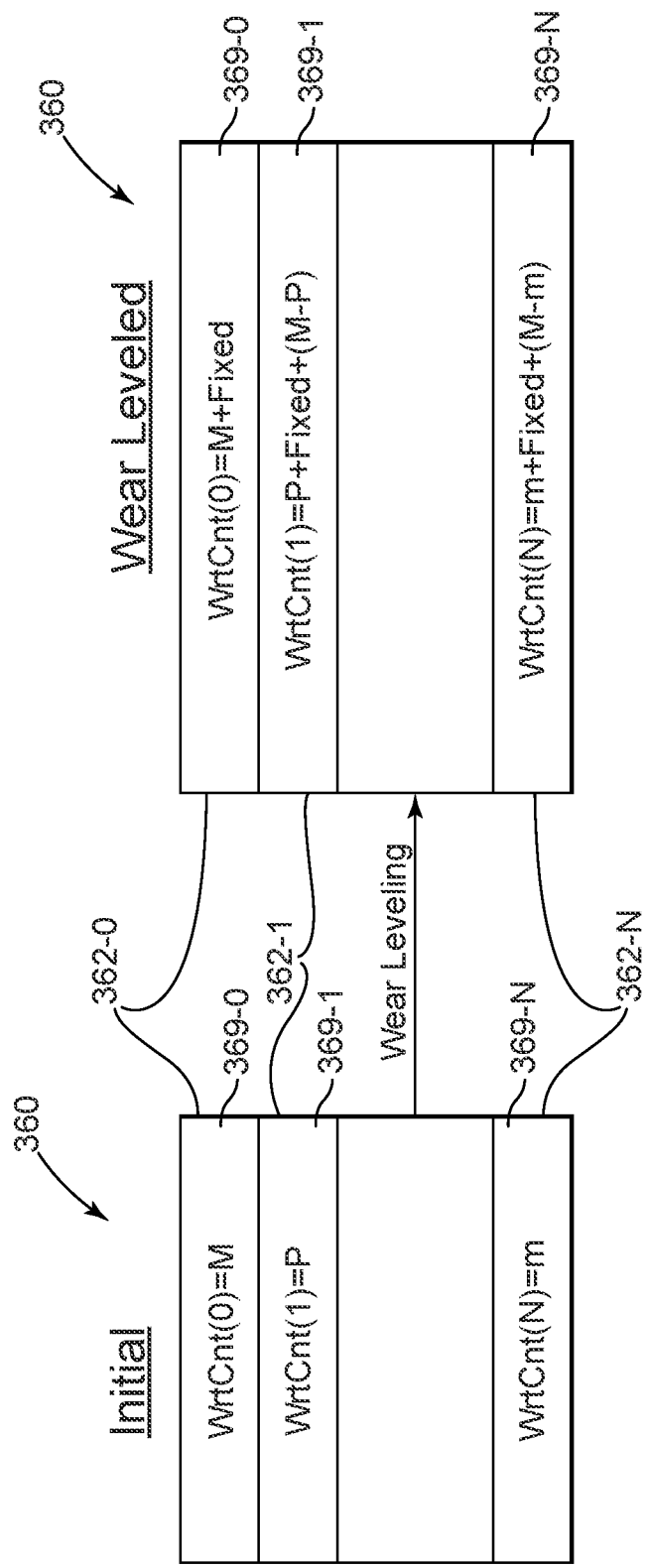
FIG. 3B illustrates an example of wear leveling a fragment of a storage memory, in accordance with a number of embodiments of the present disclosure.

In other examples, fragment 360 may be dynamically assigned after fragment 360 is previously written, for example, after segments 362-0 to 362-N are respectively previously written a respective different number of times. FIG. 3B illustrates an example of wear leveling fragment 360 (e.g., during initialization of storage system 102) in accordance with a number of embodiments of the present disclosure.

FIG. 3B shows an initial state of fragment 360 when fragment 360 is first dynamically assigned and the corresponding initial values of the write counts WrtCnt(0) to WrtCnt(N) respectively of segments 362-0 to 362-N. For example, the respective initial values of the write counts are the number of times the respective segments 362-0 to 362-N have been previously written at the time of the assignment. In the example of FIG. 3B, initial values of the write counts WrtCnt(0) to WrtCnt(N) are respectively M, P, and m.

FIG. 3B further shows the wear-leveled state of fragment 360 and the corresponding common wear-leveled value of the write counts WrtCnt(0) to WrtCnt(N). For example, at the wear-leveled state, the write counts WrtCnt(0) to WrtCnt(N) all have the same wear-leveled value, and fragment 360 is about to be released and subsequently replaced by another fragment 360. For example, the wear-leveled value may less than the threshold number times the segments can be written during their lifetime.

The wear leveling in the example of FIG. 3B includes controller 108 determining the common wear-leveled value of the write counts for the wear-leveled state. Controller 108 may determine the common wear-leveled value by determining which segment 362 of fragment 360 has been previously written the greatest number of times. For example, controller 108 may read the initial values of the write counts (e.g., from the respective write count regions 369) and determine the maximum of the initial values of the write counts. For example, controller 108 may determine the maximum of M, P, and m (e.g., M) and the corresponding segment (e.g. segment 362-0).

Controller 108 may then determine the common wear-leveled value by adding a fixed number "Fixed" to M so that the common wear-leveled value is M+Fixed, in which Fixed is a number of times segment 362-0 is to be overwritten during the wear leveling. In some examples, the fixed number is selected so that the common wear-leveled value M+Fixed is less than the threshold number times the segments can be written during their lifetime so that wear-leveled fragment 360 can be dynamically reassigned (e.g., for storing addresses at an intermediate level) after it is released.

Controller 108 may then determine the number of times each of the respective remaining segments 362-1 to 362-N is to be overwritten during wear leveling. For example, the respective number of times each respective remaining segment is to be overwritten is the common number of times minus the respective initial value of the write count of the respective remaining segment. For example, segment 326-1 may be overwritten Fixed+M−P times, and segment 326-N may be overwritten Fixed+M−m times. Note that the wear-leveled value of each respective write count of each respective remaining segment is the initial value of the respective write count of the respective remaining segment plus the respective number of times the respective remaining segment is to be overwritten. For example, the wear-leveled value the write count WrtCnt(1) of segment 362-1 is P+Fixed+M−P=Fixed+M, and the wear-leveled value the write count WrtCnt(N) of segment 362-N is m+Fixed+M−m=Fixed+M.

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
a memory, comprising first, second, and third portions; and
a controller configured to:
perform a read of a segment in the first portion to determine an address of a segment in the third portion of the memory, wherein the segment in the third portion is a segment of a set of segments in the third portion used to store addresses of segments of a set of segments in the second portion;
perform a read of the segment in the third portion to determine an address of a segment of the set of segments in the second portion to determine the location of particular information, wherein the segment in the second portion is a segment of the set of segments in the second portion used to store the particular information;
wherein a number of segments of the set of segments in the second portion are allocated to accommodate a final number of potential writes that is greater than an expected number of times the particular information is to be written during a lifetime of the memory; and
wherein a number of segments of the set of segments in the third portion are allocated to accommodate an intermediate number of potential writes that is greater than the final number of potential writes accommodated by the number of segments of the set of segments in the second portion.

2. The apparatus of claim 1, wherein the particular information is initialization information associated with the apparatus.

3. The apparatus of claim 1, wherein an initial address level is assigned to the first portion, a final address level is assigned to the second portion, and an intermediate address level, between the initial address level and the final address level, is assigned to the third portion.

4. The apparatus of claim 1, wherein the memory is a nonvolatile storage memory.

5. The apparatus of claim 1, wherein the set of segments of the third portion includes a first number of segments and a second number of segments, and wherein the controller is configured to use the second set of segments in response to the first number of segments being written a particular number of times.

6. The apparatus of claim 1, wherein the memory comprises a three-dimensional array of cross-point memory cells.

7. The apparatus of claim 6, wherein the memory cells are resistance variable memory cells that can be overwritten without first being erased.

8. The apparatus of claim 7, wherein the memory cells comprise a chalcogenide material.

9. The apparatus of claim 7, wherein the chalcogenide material serves as one or both of a storage element for the memory cell and a switch element for the memory cell.

10. A method, comprising:
performing multiple reads of a memory at respective address levels to determine a starting address corresponding to a location of particular information;
wherein the respective address levels comprise an initial address level assigned to a first portion of the memory, a final address level assigned to a second portion of the memory, and an intermediate address level that is between the initial address level and the final address level and that is assigned to a third portion of the memory;
wherein performing the multiple reads of the memory comprises:
performing a read of a segment in the first portion to determine an address of a segment in the third portion, wherein the segment in the third portion is a segment in a set of segments in the third portion used to store addresses of segments in a set of segments in the second portion;
performing a read of the segment in the third portion to determine an address of the segment in the second portion, wherein the segment in the second portion is a segment in the set of segments in the second portion used to store the particular information;
wherein a number of segments of the set of segments in the second portion are allocated to accommodate a final number of potential writes that is greater than an expected number of times the particular information is to be written during a lifetime of the memory; and
wherein a number of segments of the set of segments in the third portion are allocated to accommodate an intermediate number of potential writes that is greater than the final number of potential writes accommodated by the number of segments in the second portion.

11. The method of claim 10, wherein the method includes performing the multiple reads during an initialization process.

12. The method of claim 10, further comprising, responsive to updating the segment in the second portion of the memory a threshold number of times:
changing the segment in the second portion to a different segment in the second portion; and
updating the segment in the third portion such that the segment in the third portion of the stores an indication of an address of the different segment in the second portion.

13. The method of claim 10, further comprising wear leveling the third portion of the memory as part using the multilevel addressing scheme.

14. The method of claim 13, wherein performing the wear leveling of the third portion of the memory comprises overwriting each respective segment of a plurality of segments in the third portion a fixed number of times so that the respective segments are written a same number of times, and wherein at least one of the plurality of segments in the third portion is overwritten each time a segment in the second portion used to store the particular information is changed.

15. A system, comprising:
a host; and
a storage system configured to receive commands from the host, the storage system comprising:
a storage memory having a first portion corresponding to an initial address level, a second portion corresponding to a final address level, and a third portion corresponding to an intermediate address level; and
a controller coupled to the storage memory and configured to, during initialization of the storage system, locate particular information stored in the storage memory by:
performing a read of a segment in the first portion to determine an address of a segment of a set of segments in the third portion; and
performing a read of the segment in the set of segments in the third portion to determine an address of a segment in the second portion to determine the location in the storage memory that stores the particular information;
wherein the segment in the second portion is one of a number of segments at the final address level; and
wherein the number of segments of a set of segments at the final address level are allocated to accommodate a number of potential writes that is greater than an expected number of times the particular information is to be written during a lifetime of the storage memory.

16. The system of claim 15, wherein the particular information comprises a starting address of a logical to physical mapping table, and wherein the controller is configured to read the mapping table into random access memory of the storage system during initialization.

17. The system of claim 15, wherein the controller is configured to provide a ready signal to the host upon completion of the initialization.

18. The system of claim 15, wherein the storage system comprises a solid state drive.

19. The system of claim 15, wherein each segment in the set of segments in the third portion comprises a storage region and a write count region, the write count region storing a quantity of writes performed on the respective segment.

20. The system of claim 19, wherein the controller is configured to:
track a quantity of overwrites to storage regions corresponding to respective segments of the set of segments in the third portion; and
update the write count regions corresponding to the respective segments of the set of segments in the third portion during a power down of the storage system.

* * * * *